Feb. 16, 1943.   L. A. WILKIE   2,311,426
SAWING APPARATUS
Filed Oct. 23, 1939   5 Sheets-Sheet 1
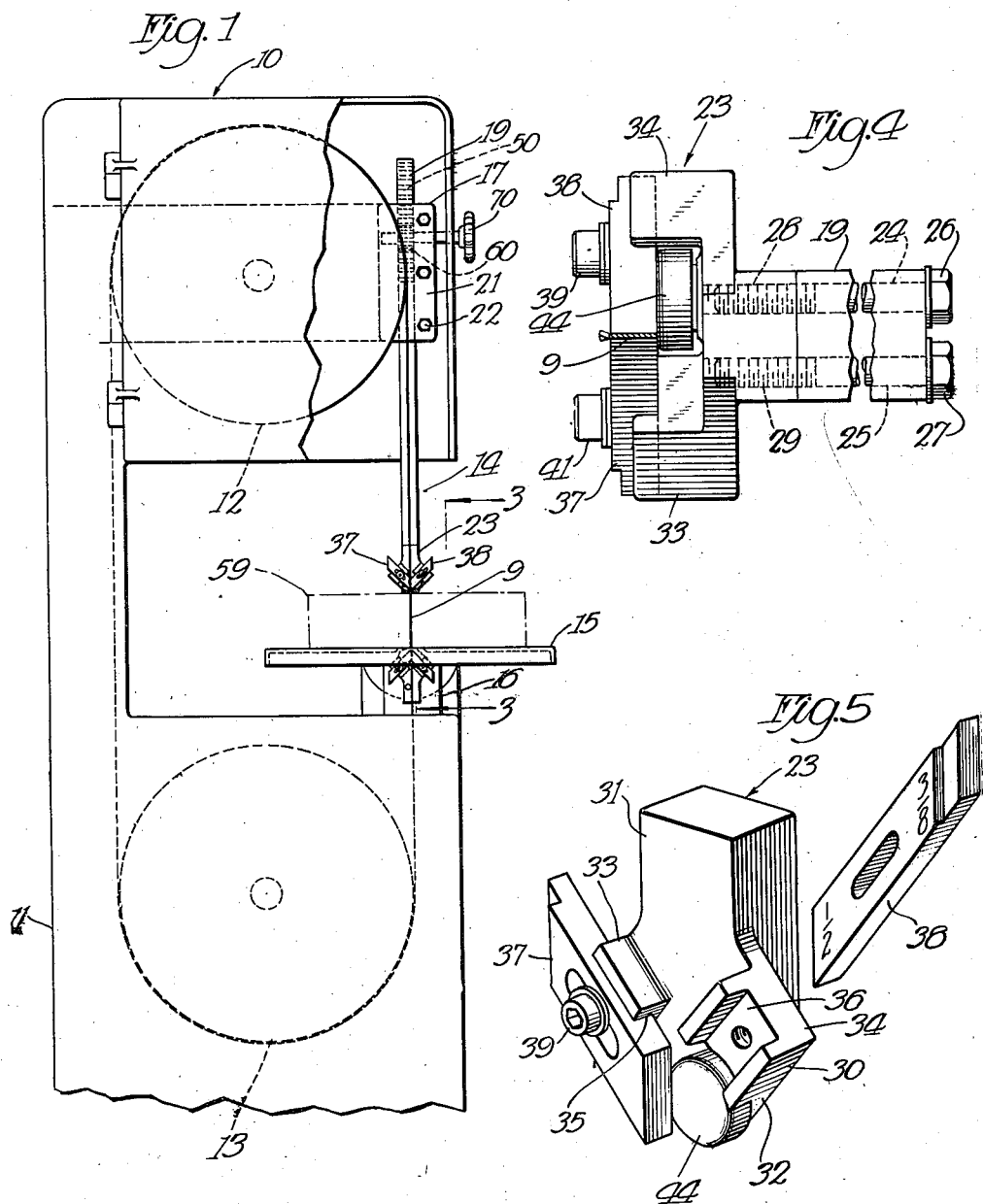
Inventor:
Leighton A. Wilkie
By Mann, Brown & Cot
Attys.

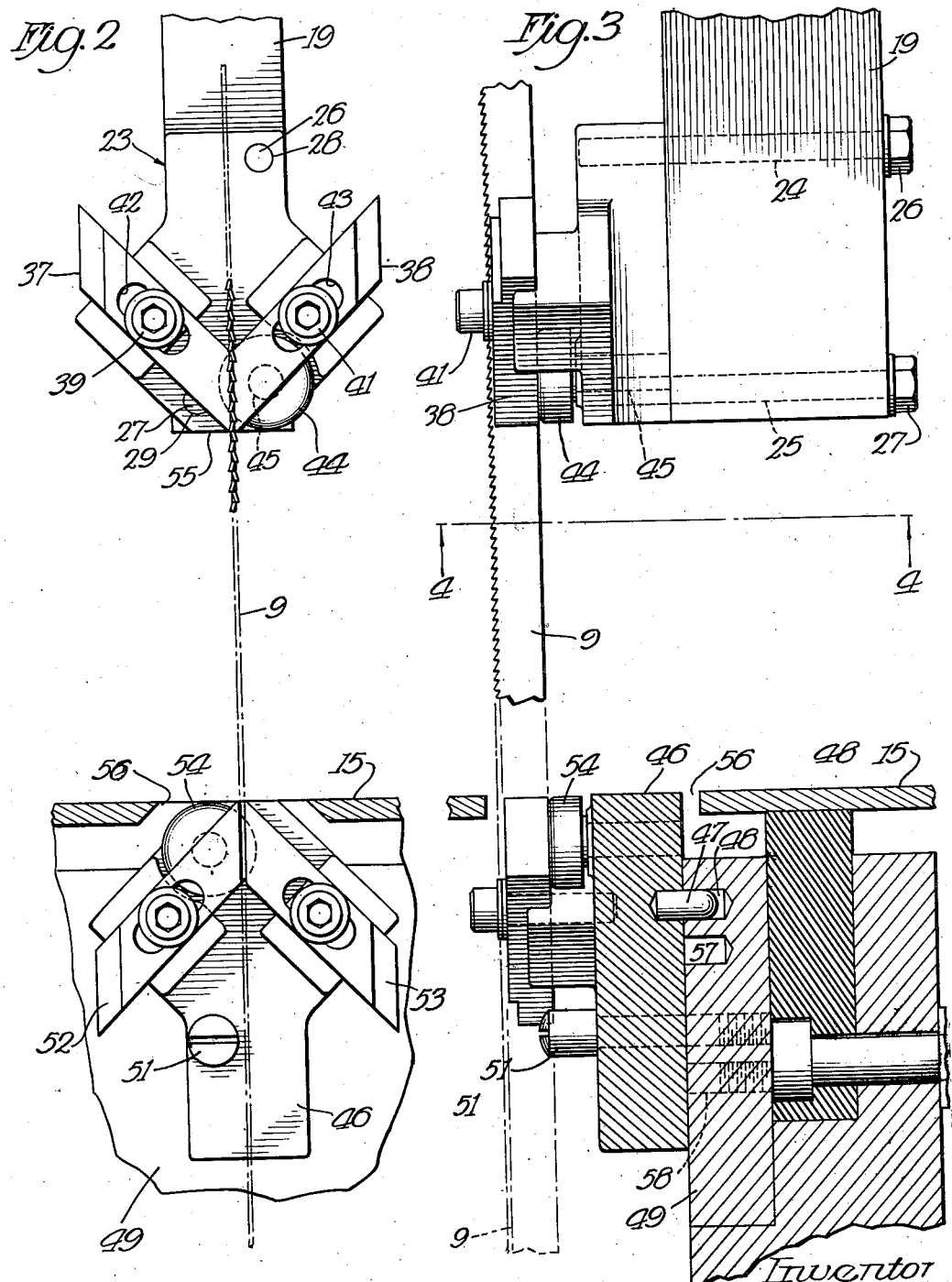

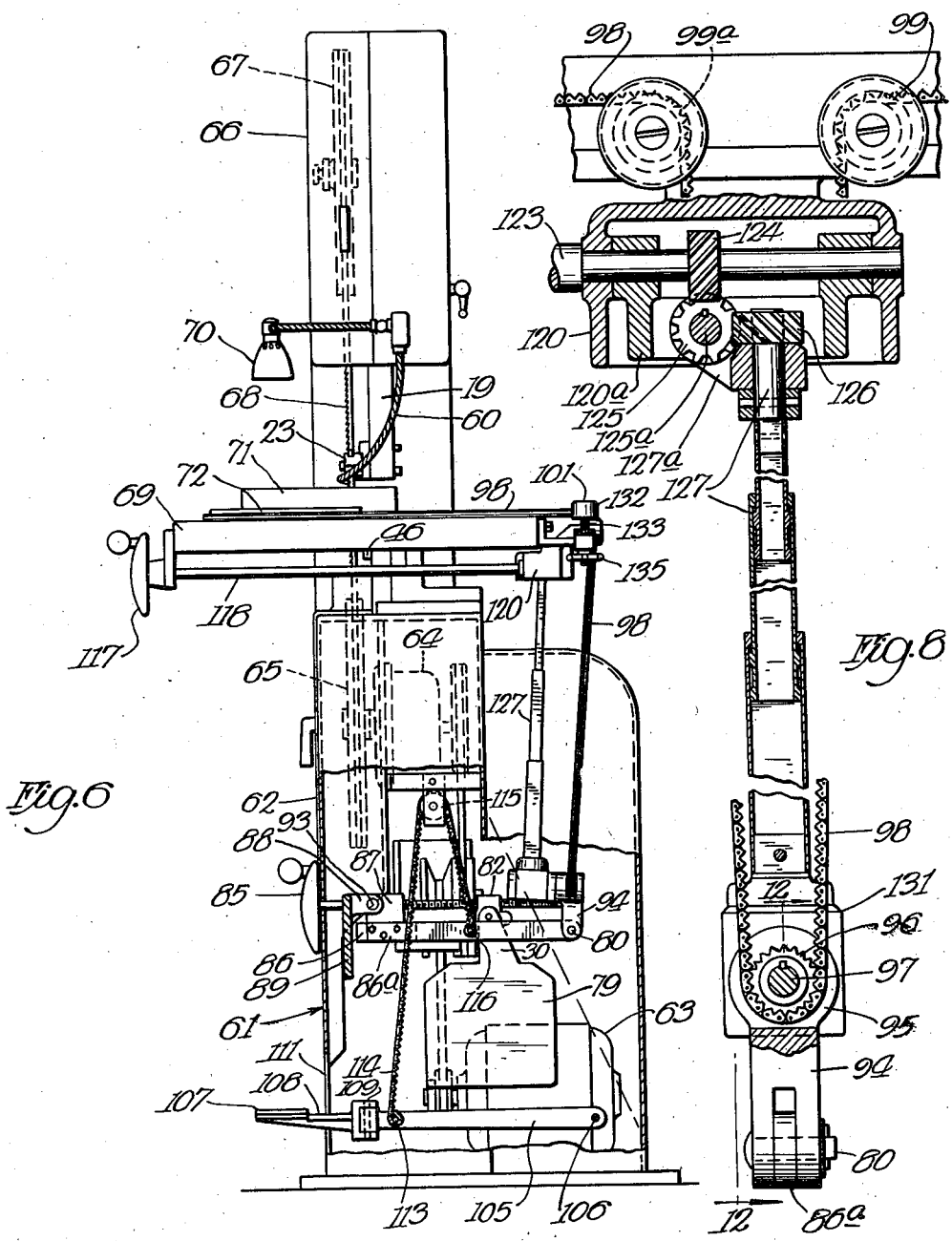

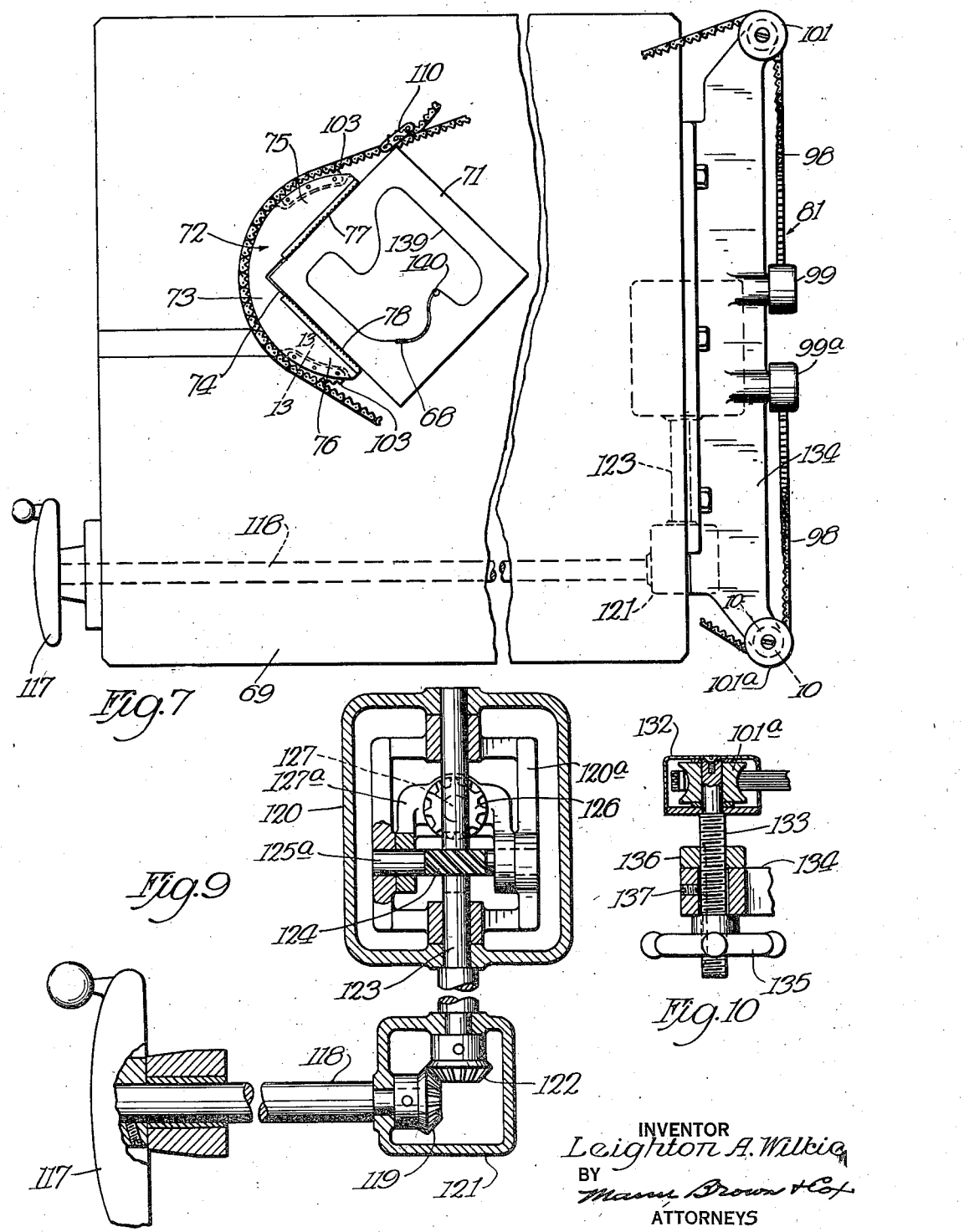

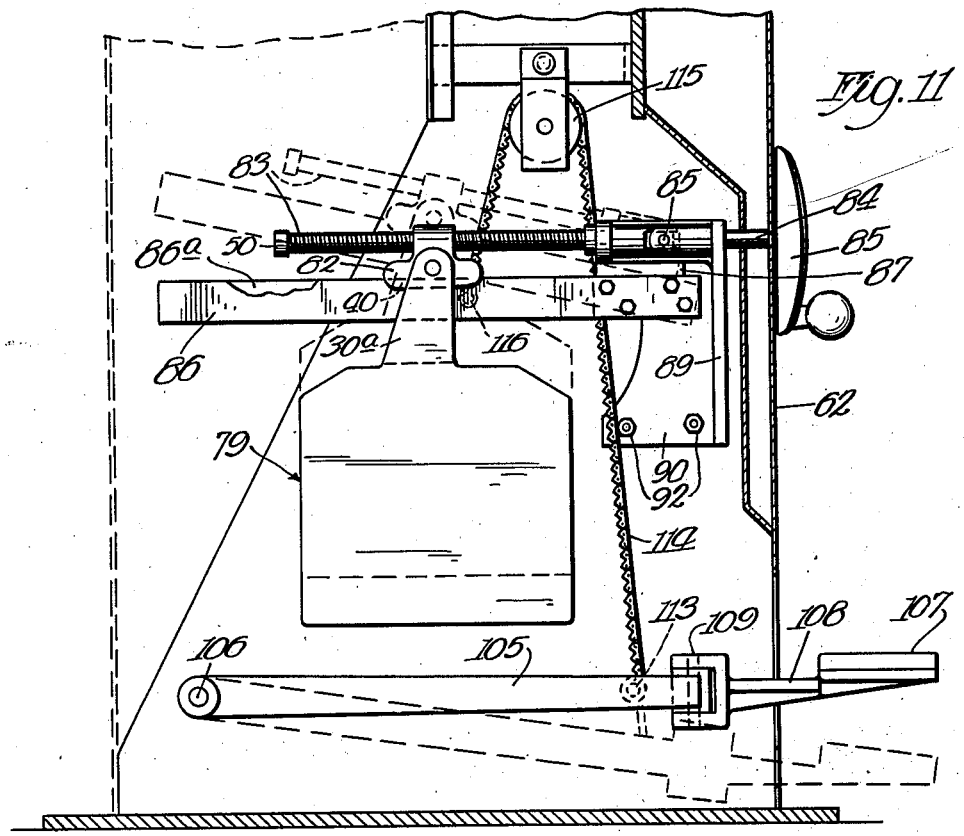
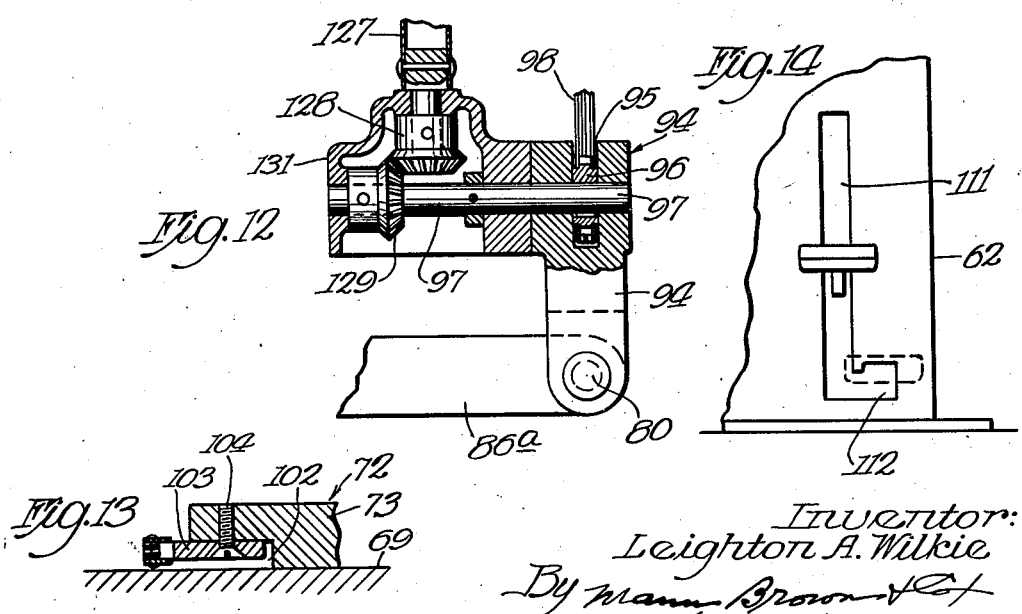

Patented Feb. 16, 1943

2,311,426

UNITED STATES PATENT OFFICE 2,311,426

SAWING APPARATUS

Leighton A. Wilkie, Libertyville, Ill.

Application October 23, 1939, Serial No. 300,737

3 Claims. (Cl. 143—161)

This invention relates to band saw machines and more particularly to guides and feeding mechanism therefor.

One of the objects of the invention is the provision of a new and improved band saw apparatus having novel saw guiding and feeding mechanism.

Another object of the invention is the provision of new and improved feeding mechanism for band saw machines whereby the work may be manipulated by power means while being operated upon.

Another object of the invention is the provision of a new and improved guide for band saws that guides the band in close proximity to the work.

Another object of the invention is the provision of a new and improved band saw guide that is adjustable for compensating for wear and for variations in the thickness of the bands employed.

A further object of the invention is the provision of a new and improved saw guide having the guide elements reversible for accommodating saw bands of different widths.

A still further object of the invention is the provision of a new and improved saw band guide and feeding mechanism that is simple in construction, efficient in operation, inexpensive to manufacture, easily assembled and adjusted and that may be removed from the sawing machine with a minimum of time and labor.

Other and further objects and advantages of the invention will appear from the following description, taken in connection with the accompanying drawings, in which—

Fig. 1 is a side elevation of a sawing machine or apparatus, with parts broken away, showing the guide in position thereon;

Fig. 2 is an enlarged view similar to Fig. 1 but showing only the working zone;

Fig. 3 is a section along line 3—3 of Fig. 1;

Fig. 4 is a section on the line 4—4 of Fig. 3;

Fig. 5 is a perspective view of one of the guide blocks showing one of the guide elements in operative position and the other in position to be inserted;

Fig. 6 is a front elevation of a metal sawing apparatus with the invention in position thereon;

Fig. 7 is a top plan view thereof, with parts broken away for the sake of clearness;

Fig. 8 is a vertical section of a portion of the feed control mechanism, with parts broken away and parts omitted for the sake of clearness;

Fig. 9 is a horizontal section of a detail of the control mechanism for the feed in the plane of the shaft for the upper hand wheel, with parts broken away;

Fig. 10 is a vertical section on the line 10—10 of Fig. 7;

Fig. 11 is a vertical section through the base of the machine showing a portion of the power operated feed mechanism;

Fig. 12 is a vertical section of a portion of the power feed mechanism taken on line 12—12 of Fig. 8 and in a plane at right angles to that shown in Fig. 8, and with parts broken away;

Fig. 13 is a vertical section on the line 13—13 of Fig. 7, with parts omitted and parts broken away; and Fig. 14 is a front elevation of a portion of the base of the machine showing the treadle mechanism and means for holding it in depressed position.

In the operation of band saws, it is often necessary that extreme accuracy in sawing be accomplished. The saw band is more or less flexible and difficult to control and unless the guides be substantially accurate and closely adjusted, accurate work is extremely difficult if not impossible. In the execution of fine work, the closer the guides be adjusted to the work, the more accurate the work is likely to be. But where the article that is being operated upon is small and manipulated by hand, it is extremely difficult for the operator to see the lines for guiding the work on account of his hands obstructing his view.

The present invention seeks to remedy these difficulties by the provision of new and improved guides together with novel mechanism for guiding the work during the sawing operation. By employing means for feeding the work to the saw and for manipulating the work as occasion may require, without the necessity of feeding the work by hand, the guides may be adjusted much closer to the work thereby insuring finer and more accurate sawing than would be possible otherwise. In the present invention, the saw guides are so constructed as to interpose a minimum of obstruction to a clear view of the work even though they be adjusted in close proximity thereto. With the substitution of the power feed for the hand manipulation, a clear view is had of the work at all times and as a result, better and more accurate work may be done in a shorter period of time.

The saw guide mechanism will first be described. On Figs. 1, 2 and 3 is shown a sawing machine equipped with improved guides. The feeding mechanism is omitted from these figures for the sake of clearness.

Referring now to the drawings, the reference character 10 designates a band filing machine which comprises a frame 11 having vertically spaced pulleys 12 and 13 mounted therein about which the flexible saw band 9 is trained. The frame is roughly C-shape in form defining a recess 14 within which is the working zone, as is usual in such constructions. A working table 15 is adjustably mounted on a support 16 and defines the lower portion of the working zone. The table may be adjusted angularly in the usual manner. Since the details of the apparatus thus far described, including the tilting mechanism for the table, is of the usual or any well known construction, it is not thought necessary to illustrate or describe the same in detail.

The upper overhanging portion 17 of the C-shaped frame is provided with a guide post 19 slidably mounted in a keeper 21, as shown in Fig. 1 of the drawings. The keeper is secured to the overhanging portion 17 by suitable screws or bolts 22. The guide post is raised and lowered by a rack and pinion. The rack 50 on the post is adapted to be engaged by the pinion 60, which in turn is rotated by a hand wheel 70.

Suitable means are provided for guiding the saw band 9 in its passage across the work. As shown, an upper and a lower guide block are employed for this purpose. The upper guide block 23 is adapted to be rigidly secured to the guide post 19, as will now be described.

The lower end of the guide post is provided with openings 24 and 25, Fig. 4, which are adapted to receive screw bolts 26 and 27 which extend through said openings. The guide block 23, Fig. 4, is provided with corresponding screw threaded openings 28 and 29, Figs. 2 and 4, for receiving the threaded ends of the bolts 26 and 27, as shown more clearly in Fig. 2 of the drawings. The bolts 26 and 27 rigidly hold the guide block 23 in position on the lower end of the guide post 19. This upper guide block 23, Fig. 5, is provided with an upstanding shank 31 and a head portion 32. The head portion 32 has laterally extending flange members or wing portions 33 and 34, Fig. 5, which have their lateral faces 30 tapering downwardly and resemble an arrow head.

By tapering the block, a maximum of clearance is provided about the same. This is considered an important feature of the invention since it provides ample space about these blocks for the operator to manipulate the work. The wing portions 33 and 34 have grooves 35 and 36 on what will be termed their front faces, which converge downwardly and which are adapted to adjustably receive guide elements or inserts 37 and 38 which are slidably mounted therein. Each of the guide elements is rectangular in cross-section and has its inner end beveled or cut on a bias so that when the elements are in operative position, slightly spaced apart, they form a vertical slot or groove through which the saw band extends and is guided. The parts are so arranged that the slot or groove will be in the plane of the bisector of the angle formed by the guide elements. The guide elements are held in position by suitable screw-threaded bolts 39 and 41 which extend through slots 42 and 43 in the guide elements 37 and 38, respectively, as clearly shown in Fig. 2 of the drawings. The slots enable the operator to adjust the guide elements to compensate for wear and for different thickness of saw bands, and the like.

Saw bands are of different widths and it is necessary that the guide elements do not extend any further forwardly than the base of the teeth because of the set of the teeth. The guide elements 37 and 38 are so constructed that they may be used on saw bands of two different widths. In the form of the construction selected to illustrate one embodiment of the invention, each of these elements is a half inch thick at one end and each element has a rabbet at its opposite end which reduces the thickness of this opposite end to say ⅜ of an inch. In a saw of the width shown on the drawings, the thickest portion of the guide elements are employed for guiding the same and it will be noted that they are of substantially the same thickness as the width of the saw band from its back to the plane of the base of the teeth as shown in Fig. 3. If a narrower saw band be employed, say one that has a width of ⅜ of an inch between the back of the saw and the plane of the base of the teeth, the guide elements will be reversed end for end. If wider or narrower bands be used than those disclosed, other guide elements will be necessary.

Suitable means are provided for preventing the saw from moving inwardly beyond a predetermined distance toward the guide post under pressure of the work. As shown, a thrust roller 44 rotatably mounted on a shaft 45 is employed for resisting the back thrust of the band. The axis of the roller 44 is laterally of the saw band so that the band extends as a cord across the face of the roller and engages one side edge portion only thereof, as shown more clearly in Fig. 2 of the drawings. The roller 44 is mounted in a recess formed in the guide block and is between the saw and said block. This roller is adapted to be stamped from sheet metal and is cup-shaped having conventional thrust anti-friction bearings.

A lower guide block 46 is adapted to be used beneath the working zone for guiding the saw band. This block is similar to the one already described, except that it is provided adjacent its upper end with a positioning or guiding stud 47, Fig. 3, which is rigidly connected to the guide block 46 and is adapted to engage a corresponding opening 48 in a block 49 rigidly secured to the table support 16. The lower end of the block 46 is provided with an opening which registers with a corresponding screw-threaded opening in the block 49 in which is adapted to be inserted a screw bolt 51 for holding the guide block 46 rigidly in position. Since the guide elements 52 and 53 and the thrust bearing or roller 54 are substantially the same as the corresponding parts in the upper guide block, it is not thought necessary to repeat the description at this stage.

The lower tapered end 55 of the upper guide block terminates slightly below the lower ends of the guide elements so that the guide block may be brought down into close proximity to the work being operated upon without the guide elements being in contact therewith and yet be contiguous to the work. The same is also true of the arrangement of the lower guide block, except that the block extends slightly above instead of below the guide elements. The lower guide block extending into a slot 56 in the table 15, Fig. 2, so that the table may be tilted in either direction a predetermined amount, it would be necessary to lower the guide block and this is done by providing additional openings 57 and 58 which are adapted to be engaged by the pin 47 and bolt 51.

In the operation of the device, the work 59 to be operated upon is placed upon the table 15 and the upper guide post 19 adjusted downwardly in close proximity to the work just so that it does not frictionally engage the same. It will thus be seen that the saw is guided immediately above and below the work during the operation of the apparatus.

On Figs. 6 to 14, inclusive, is shown the entire sawing machine with the feed mechanism shown more in detail.

Referring now to Fig. 6, the reference character 61 designates the sawing apparatus which is substantially the same, or similar to, the sawing apparatus 10 shown in Fig. 1. This apparatus comprises a base 62 which contains a power unit 63, change speed mechanism 64 and the lower pulley 65. The superstructure is shown at 66 and has mounted therein a pulley 67 over which a saw band 68 is trained. The band 68 extends about the lower pulley 65 and is driven thereby in the usual manner. A conduit for conducting a stream of air to the working zone for keeping the upper face of the work free of filings is shown at 60 and a lamp for illuminating the work is likewise shown at 70. Since the details of the sawing apparatus thus far described constitute no part of the present invention, it is not thought necessary to further illustrate or describe the same further than to state that the machine is provided with the usual work table 69 on which the work 71 is adapted to rest. It may also be added that the machine is provided with the upper guide block 23 mounted on the vertically adjustable guide post 19 and with the lower guide block 46 as in the previously described construction. The blocks 23 and 46 are the same as those described and function in the same manner.

A suitable work holder 72, Fig. 7, is mounted on the table 69 and is freely slidable thereon. This work holder comprises a body portion 73 which has its peripheral or rear surface on the arc of a circle which, in the form shown, is approximately a semi-circle. The forward portion of the holder is provided with a notch 74 which, in the form shown, is substantially a right angle thus forming the arms 75 and 76 for the holder. These arms are provided on their inner surface with serrated gripping members 77 and 78 which are adapted to be engaged by the work 71 during the sawing operation.

Suitable means are provided for automatically yieldingly forcing the work continuously against the teeth or cutting edge of the saw during the sawing operation. In the form of the construction selected to illustrate one embodiment of the invention, a weight 79 and suitable mechanism 81 associated therewith are employed for this purpose, see Figs. 7 and 11.

The weight 79 is provided with a pair of upwardly extending arms 30 and 30a, Figs. 6 and 11, which are pivotally attached to a nut member 82. The member 82 is provided with a groove 40 for receiving the upper edge of a supporting bar 86 along which it is adapted to slide for supporting the weight 79. The member 82 is also provided with an internally threaded bore through which extends a threaded rod 83, Fig. 11. The rod 83 is connected to a shaft 84 by a universal joint as at 85 whereby the rod may be moved in a vertical plane relative to the shaft 84. The shaft 84 is journaled in a flange 89 of a bracket 90 and in the base 62. The outer end of the shaft 84 has a hand wheel 85 connected thereto for rotating the rod 83 whereby the weight may be shifted along the bar 86, as desired, for varying the pressure on the work holder 72, as will presently appear.

A second bar 86a extends parallel to the bar 86 and the two bars have rigidly attached at their forward ends a hinge block or member 87 which in turn is pivotally connected to laterally extending arms 88 on the flange 89 of the bracket 90, Figs. 6 and 11. The bracket 90 is rigidly connected to the rear wall of the base portion of the flange as by means of the bolts 92, as clearly shown in Fig. 11 of the drawings. The hinge member 87 has its hinge pintle 93 in alinement with the universal joint 85 so that the threaded rod 83 and bars 86 and 86a may hinge about an axis extending through the pivot 93. The rod 83 is provided with an enlargement 50 for limiting the rearward movement of the weight supporting nut 82.

The outer end of the bar 86a is pivotally connected to a sprocket support 94 by a pivot 89 whereby the necessary angular movement between the support 94 and the shaft 86a is provided for when the shaft 86a is elevated when the weight 79 is elevated, as will presently appear. The support 94 is provided with a slot 95 within which is rotatably mounted a sprocket 96, Figs. 8 and 12. The sprocket 96 is keyed to a shaft 97 extending through the sprocket support 94 and gear box or housing 131, Fig. 12, which is rigidly connected to the support 94. A sprocket chain 98 is trained about the sprocket 96 and around the work holder 72, Figs. 7 and 8, for urging the work toward the saw, as will now be described.

The chain 98 extends from the sprocket 96 upwardly around an idler sprocket 99, thence around an idler sprocket 101 at the outer edge of the table, see Fig. 7, and thence around the curved peripheral edge of the work holder 72, as shown more clearly in Fig. 7 of the drawings.

The arms 75 and 76 of the body portion 72 of the work holder are rabbeted on their under sides as shown at 102 in Fig. 13 in which sprocket segments 103 are rigidly connected as by means of the screws 104. These sprocket segments insure a non-slipping action between the chain and the work holder as is obvious from an inspection of Fig. 7. The sprocket chain 98, after passing around the work holder 72 extends about the idler sprocket 101a, thence around the idler sprocket 99a and back to the sprocket 96a to the point of beginning. The sprocket chain may be provided with a connector member 110 of any approved construction whereby the chain may be shortened or lengthened, or removed, as desired.

Suitable means are provided for elevating the weight 79. As shown, a foot lever 105, pivoted as at 106, is provided for this purpose. The lever 105 is provided with a foot pedal 107 which has an arm 108 pivoted to the lever 105 as at 109. The pivot 109 extends vertically and permits the pedal to be moved laterally, as will presently appear.

The shank 108 is movable vertically in a slot 111 which is provided with a lateral extension as at 112 at its lower end so that when the lever is depressed, the pedal may be moved to the right, Fig. 14, for holding the same in lowered position. Attached to the lever as at 113 is a chain or cable 114 which is trained over an idler pulley 115 and has its opposite end connected to the bar 86a as at 116.

It will thus be seen that by moving the pedal 107 downward, the weight 79 will be elevated and the sprocket 96 will simultaneously be elevated so that the work holding member 72 may be moved toward the edge of the table away from the saw to permit the work to be placed in position between the jaws 77 and 78. When the work has been placed in position, the pedal 107 may be released and the weight will urge the work toward the saw band thereby constituting an automatic feed for the saw.

Suitable means are also provided for rotating or more properly partially rotating the work holding member 72. This mechanism comprises means for moving the sprocket chain 98 so as to partially rotate the work holder and the work mounted therein. This mechanism comprises a hand wheel 117 which is mounted adjacent to the front of the table convenient to the operator, as shown more clearly in Fig. 6. The wheel is provided with a shaft 118 which is connected at its opposite end to a bevel gear 119, see Fig. 9, mounted in a casing 121. The pinion 119 engages a bevel gear 122 mounted on the shaft 123 which in turn is provided with a worm gear 124 mounted in the housing 120, see Figs. 8 and 9. The shaft 123 is journaled in the walls of the housing 120 and has mounted thereon the gear supporting yoke 120a. The worm gear 124 engages a worm 125, as shown in Fig. 8 of the drawings. The worm 125 is mounted on a shaft 125a which in turn is journaled in the yoke 120a, Figs. 8 and 9. The worm 125 meshes with a worm gear 126 mounted on the vertical shaft 127. The shaft 127 is journaled in a yoke 127a carried by the shaft 125a, as shown in Figs. 8 and 9. The vertical shaft 127 is telescopic, as shown in Fig. 8, and has rigidly attached to its lower end a bevel gear 128, see Fig. 12, which meshes with a cooperating bevel gear 129 mounted on the shaft 97 to which the sprocket 96 is rigidly connected. The gears 128 and 129 are mounted in a gear case or housing 131 carried by the sprocket support 94.

It will thus be seen that when the hand wheel 117 is moved in one direction, it will cause the gears 119 and 122 to rotate the shaft 123 which in turn will rotate the telescopic shaft 127 through the worm gear drive 124, 125 and 126, as clearly shown in Fig. 8 of the drawings, for rotating the shaft 97 and with it the sprocket 96. The rotation of the sprocket 96 will cause movement of the chain 98 which in turn will move the work holder 72 and the work 71 held thereby for causing the saw to follow a predetermined design. When the wheel is turned in the opposite direction, it will cause the chain 98 to move in the opposite direction for turning the work in the opposite direction, as desired.

The idlers 99 and 99a, 101 and 101a may all be provided with guards or shields 132 to guard against accidents in the operation of the machine. If desired, means may be provided for raising and lowering the idlers 101 and 101a so as to properly position the sprocket chain 98 with reference to the top of the table 69. As shown, the idlers are mounted on a shaft 133 extending through a support 134 on the table 69 and on the lower end of which is threaded a hand wheel 135, see Fig. 10. A binding or clamping nut 136 threaded on the rod 133 is adapted to engage the upper surface of the support 134. A set screw 137 may, if desired, be provided for engaging the threaded rod 133 for preventing its rotation.

In the operation of the sawing machine, if it is desired to do internal sawing, the design or outline of the opening 139 is laid out on the work 71 and a hole 140 is drilled through the work on the line outlining the design through which the saw band 68, after it has been severed, is inserted. The weight 79, having previously been elevated, is held in elevated position by the treadle arm engaging in the notch 112. This gives sufficient slack in sprocket chain 98 to properly position the holder. After the saw band has been welded and the guides 23 and 46 have been adjusted into close proximity to the work, the machine is started, the weight released, and the saw 68 is caused to trace the design or line 139 by properly turning the work with the aid of the hand wheel 117. The weight will automatically force the work continuously against the saw. For thicker or harder material, it may be desirable to increase the force applied to the work for properly forcing it toward the work. This may be accomplished by turning the hand wheel 85 for moving the weight rearwardly away from the operator along the supporting bar 86 and vice versa.

It is thought from the foregoing, taken in connection with the accompanying drawings, that the construction and operation of my device will be apparent to those skilled in the art and that changes in size, shape, proportion and detail may be made without departing from the spirit and scope of the appended claims.

I claim as my invention:

1. A guide for saw bands comprising a guide block having laterally extending wings provided with downwardly converging grooves, a pair of guide elements having their inner ends beveled and of the same thickness and their outer ends beveled and of the same thickness but of a different thickness from their inner ends, the end faces of said guide elements being parallel whereby said guide elements may be reversed, end for end, for accommodating saw bands of different widths, means for reversibly and adjustably securing said guide elements in said grooves to form a vertical slot for guiding a band saw, a thrust roller and a shaft for mounting said roller at the rear of said slot, said roller being freely rotatable on said shaft and said shaft lying laterally of said slot and in a plane parallel therewith whereby a saw band will engage said roller only on one side thereof.

2. In a guide for a saw band, a guide block, downwardly converging grooves on said block, guide elements adjustably mounted on said block within said grooves to form a slot between them for receiving a saw band, each of said guide elements being reversible and one end being thicker than the other for accommodating saw bands of different widths, a thrust roller for engaging the back of said band, and means on the lower portion of said guide block laterally of said slot for mounting said thrust roller to rotate freely behind said slot and in proximity thereto, said roller being between said block and elements and offset laterally from said slot, and said roller extending downwardly substantially to the plane of the lower extremity of said guide elements.

3. A guide for band saws comprising guide elements forming an angle, means for holding said elements spaced apart to form a band guiding slot, and a thrust roller having a side portion extending across the rear of said slot adjacent to said elements, said roller being freely rotatable and having its axis offset laterally of said slot, each of said guide elements being reversible and having its opposite end portions provided with parallel faces but of different thickness.

LEIGHTON A. WILKIE.